United States Patent
Eickhoff

(10) Patent No.: US 9,991,532 B2
(45) Date of Patent: Jun. 5, 2018

(54) HYDROGEN FUEL CARTRIDGE WITH SPRING LOADED VALVE

(71) Applicant: Honeywell International Inc., Morris Plains, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

(21) Appl. No.: 15/135,860

(22) Filed: Apr. 22, 2016

(65) Prior Publication Data

US 2016/0240871 A1    Aug. 18, 2016

Related U.S. Application Data

(62) Division of application No. 13/710,935, filed on Dec. 11, 2012, now Pat. No. 9,346,032.

(51) Int. Cl.
| | |
|---|---|
| *H01M 8/04082* | (2016.01) |
| *C01B 3/00* | (2006.01) |
| *H01M 8/02* | (2016.01) |
| *B01J 19/24* | (2006.01) |
| *C01B 3/06* | (2006.01) |
| *H01M 8/0606* | (2016.01) |

(52) U.S. Cl.
CPC ......... *H01M 8/04208* (2013.01); *B01J 19/24* (2013.01); *C01B 3/0005* (2013.01); *C01B 3/065* (2013.01); *H01M 8/02* (2013.01); *H01M 8/0606* (2013.01); *B01J 2219/24* (2013.01); *Y02E 60/362* (2013.01); *Y02E 60/50* (2013.01); *Y10T 29/49817* (2015.01); *Y10T 29/49826* (2015.01)

(58) Field of Classification Search
CPC .. H01M 8/04208; H01M 8/02; H01M 8/0606; C01B 3/0005; C01B 3/065; B01J 19/24; B01J 2219/24; Y02E 60/50; Y02E 60/362; Y10T 29/49817; Y10T 29/49826
See application file for complete search history.

(56) References Cited

U.S. PATENT DOCUMENTS

| | | | |
|---|---|---|---|
| 1,384,305 A | 7/1921 | Meador et al. | |
| 2012/0040257 A1 | 2/2012 | Sasaki et al. | |

(Continued)

FOREIGN PATENT DOCUMENTS

| | | | |
|---|---|---|---|
| EP | 1422777 A1 | 5/2004 | |
| EP | 1554769 A1 | 7/2005 | |
| EP | 1642356 A2 | 4/2006 | |

(Continued)

OTHER PUBLICATIONS

"U.S. Appl. No. 13/710,935, Advisory Action dated Dec. 23, 2015", 3 pgs.

(Continued)

*Primary Examiner* — John C Hong
(74) *Attorney, Agent, or Firm* — Schwegman Lundberg & Woessner, P.A.

(57) ABSTRACT

A hydrogen generating fuel cartridge includes a case having a perforated opening layer. A hydrogen producing fuel is disposed within the case. A hydrogen permeable membrane is disposed between the hydrogen producing fuel and the perforated opening layer in the case. A spring loaded slideable valve plate is positioned adjacent the perforated opening layer such that the slideable valve plate and perforated opening form a valve that is biased in a closed position to prevent hydrogen from escaping from the fuel cartridge.

12 Claims, 2 Drawing Sheets

(56) References Cited

U.S. PATENT DOCUMENTS

2013/0260270 A1 10/2013 Eickhoff
2014/0157565 A1 6/2014 Eickhoff

FOREIGN PATENT DOCUMENTS

EP 1668728 B1 6/2007
EP 1673236 B1 2/2012

OTHER PUBLICATIONS

"U.S. Appl. No. 13/710,935, Final Office Action dated Oct. 15, 2015", 11 pgs.
"U.S. Appl. No. 13/710,935, Non Final Office Action dated Jan. 12, 2015", 7 pgs.
"U.S. Appl. No. 13/710,935, Non Final Office Action dated May 12, 2015", 7 pgs.
"U.S. Appl. No. 13/710,935, Notice of Allowance dated Jan. 26, 2016", 8 pgs.
"U.S. Appl. No. 13/710,935, Respnse filed Dec. 14, 2015 to Final Office Action dated Oct. 15, 2015", 9 pgs.
"U.S. Appl. No. 13/710,935, Response filed Mar. 20, 2015 to Non Final Office Action dated Jan. 12, 2015", 9 pgs.
"U.S. Appl. No. 13/710,935, Response filed Aug. 11, 2015 to Non Final Office Action dated May 12, 2015", 10 pgs.
"U.S. Appl. No. 13/710,935, Response filed Dec. 20, 2014 to Restriction Requirement dated Dec. 29, 2014", 7 pgs.
"U.S. Appl. No. 13/710,935, Restriction Requirement dated Dec. 29, 2014", 5 pgs.

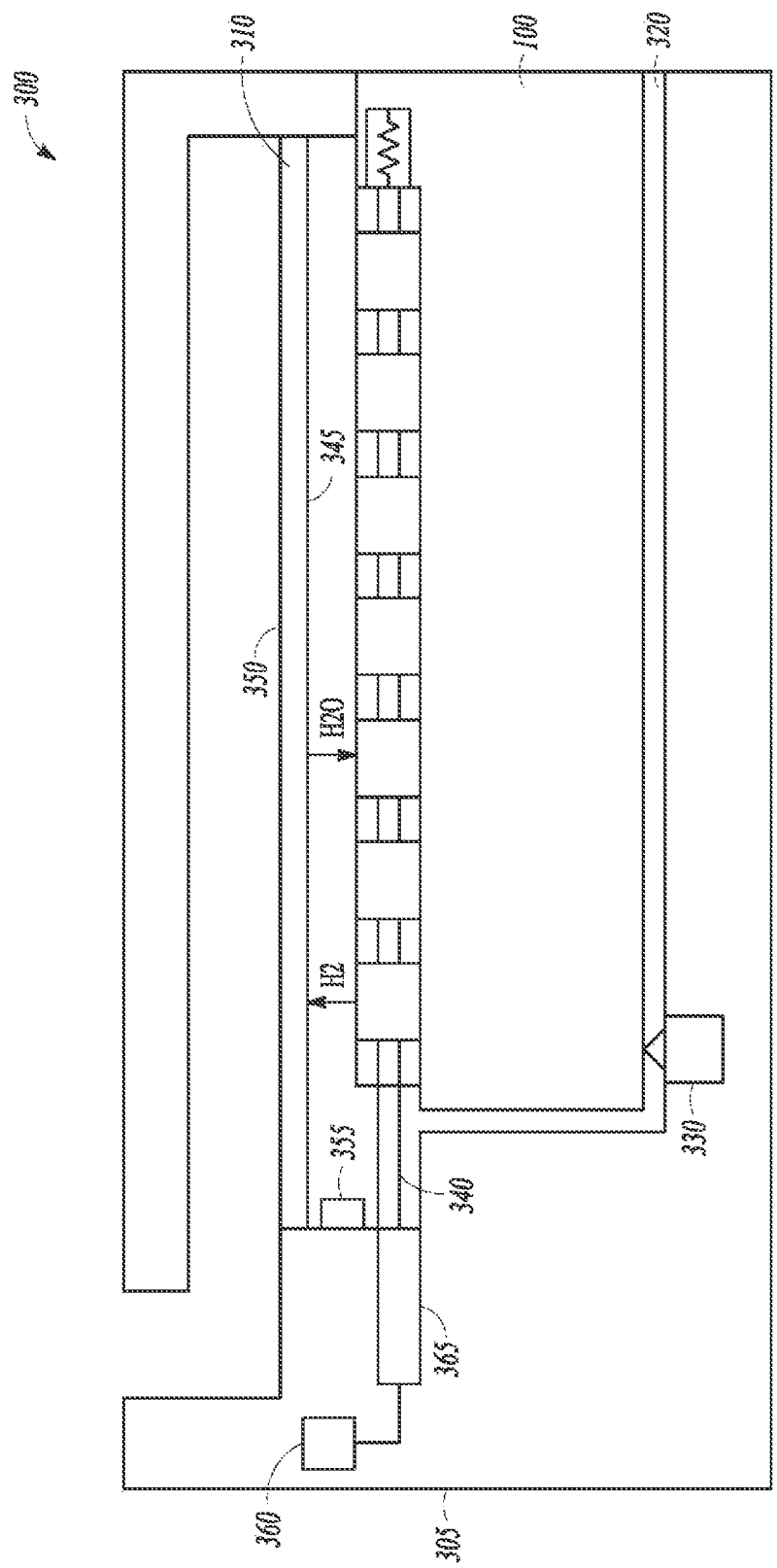

HYDROGEN FUEL CARTRIDGE WITH SPRING LOADED VALVE

CLAIM OF PRIORITY

This application is a continuation of U.S. patent application Ser. No. 13/710,935, filed on Dec. 11, 2012, the disclosure of which is incorporated herein in its entirety by reference.

BACKGROUND

Current batteries for portable electronic equipment, such as a hand held mobile devices need to be recharged fairly often. With increasing functionality of such equipment, come increasing power demands. The desired portability of the electronic equipment leads to space constraints, further increasing the demands on battery performance. The energy density of existing batteries is proving insufficient to keep pace with the power requirements of portable electronic equipment.

Fuel cells may be designed with much higher energy density than existing chemical based batteries. Fuel for fuel cells may often utilize hydrogen producing chemicals. Storage of hydrogen producing fuel for extended periods of time can be problematic.

SUMMARY

A hydrogen generating fuel cartridge includes a case having a perforated opening layer. A hydrogen producing fuel is disposed within the case. A hydrogen permeable membrane is disposed between the hydrogen producing fuel and the perforated opening layer in the case. A spring loaded slideable valve plate is positioned adjacent the perforated opening layer such that the slideable valve plate and perforated opening form a valve that is biased in a closed position to prevent hydrogen from escaping from the fuel cartridge.

In a further embodiment, a hydrogen generating fuel cartridge includes a case having a perforated opening layer. A hydrogen producing fuel is disposed within the case and contained by the perforated opening layer. A hydrogen permeable membrane is disposed between the hydrogen producing fuel and the perforated opening layer in the case. A slideable valve plate is positioned adjacent the perforated opening layer, such that the slideable valve plate and perforated opening form a valve. A spring is coupled between the case and the slideable valve plate to bias the slideable valve plate in a closed position to prevent hydrogen from escaping from the fuel cartridge. A perforated outside layer is positioned to sandwich the slideable valve plate between the perforated opening layer and perforated outside layer.

A method includes inserting a fuel cartridge into a power generator opening, engaging an actuator spring while inserting the fuel cartridge, and moving a slideable valve in the fuel cartridge from a spring loaded closed position to an open position when the fuel cartridge is fully inserted into the power generator opening.

BRIEF DESCRIPTION OF THE DRAWINGS

FIG. 3 is a block cross section diagram illustrating a fuel cartridge inserted into a power generator according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural changes may be made without departing from the scope of the present invention. The following description of example embodiments is, therefore, not to be taken in a limited sense, and the scope of the present invention is defined by the appended claims.

Figure 1:
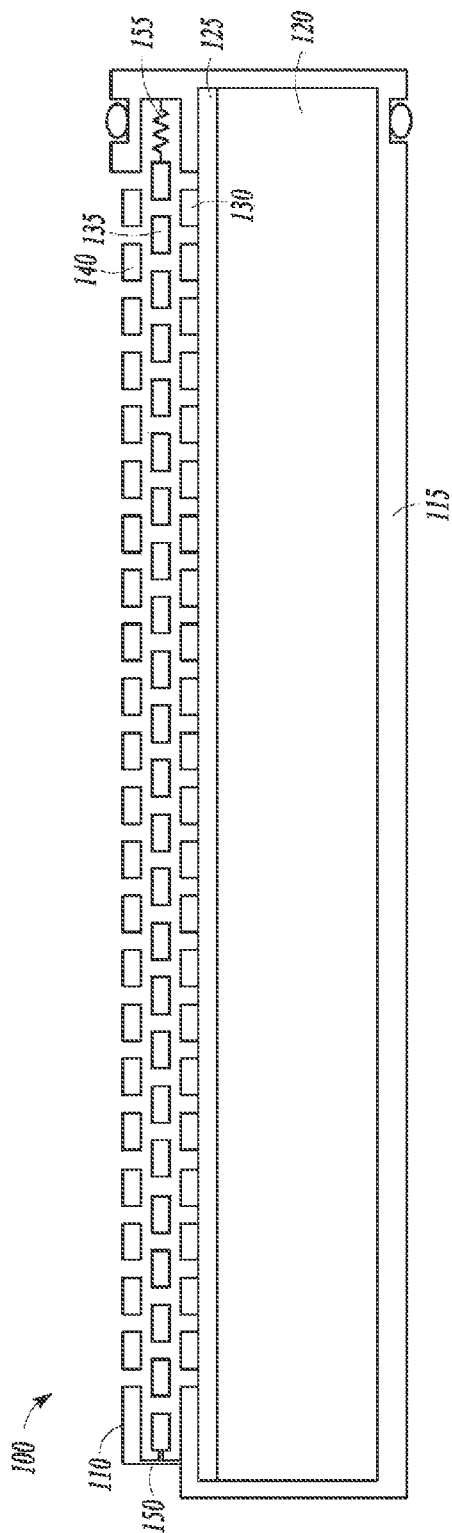
FIG. 1 is a block cross section diagram of a hydrogen fuel cartridge having a spring loaded valve according to an example embodiment.

An improved fuel cartridge 100 for a fuel cell system incorporates a high-conductance low-profile gate valve 110 which is modulated by an external actuator is illustrated at in block diagram form in FIG. 1. The gate valve 110 is normally closed such that it will prevent atmospheric gases from reaching the fuel when the fuel cartridge is not inserted into the fuel cell system. The gate valve 110 helps meet consumer safety and regulatory requirements for fuel cartridges for fuel cells.

The improved fuel cartridge 100 comprises a case 115 (metal or plastic) which contains a water reactive, hydrogen generating fuel 120 (i.e. chemical hydride), selectively permeable membrane 125, and gate valve 110. The cartridge 100 can be single or double sided, and have one or two valves 110.

In a single sided configuration, chemical hydride hydrogen generating fuel 120 is enclosed on all sides but one by the cartridge case 115, which is a gas impermeable metal or polymer material. The selectively permeable membrane 125 (vapor permeable, liquid impermeable) covers a side not covered by the cartridge case. A perforated portion 130 of the case 115 covers the selectively permeable membrane 125, trapping the fuel inside the cartridge, but allowing gases to move freely. The perforated portion 130 of the case is patterned, and doubles as a fixed or stationary valve portion 130. A moveable valve portion 135 includes a thin metal or plastic layer, and may have the same perforation pattern as the perforated case portion 130, and sits on top of the stationary portion of the valve. The moveable valve portion 135 may be moved by an external actuator, such that it slides relative to the fixed valve portion 130, varying the fraction of the perforations that are aligned, thus adjusting the conductance of the valve. A second fixed valve portion layer 140 sits on top of the moveable valve portion 135, and may have the same pattern as the moveable and fixed valve. It doubles as the top of the cartridge and helps maintain the valve portions in contact with each other to prevent hydrogen from escaping when the valve 110 is in a closed position.

In one embodiment, the moveable valve portion 135 is coupled to a spring 145 positioned between an end of the moveable valve portion and the case 115 to ensure the moveable valve portion 135 is spring loaded such that valve 110 is normally closed. The spring may be any type of compressible spring, including leaf springs, coils springs, ribbon spring, compressible material, or other element that biases the moveable valve portions such that the valve 110 is closed unless additional force is applied to move the moveable valve portion to at least partially align openings and allow hydrogen to flow through the valve 110. In one embodiment, the other end of the moveable valve portion 135 is coupled to a flexible diaphragm 150. Diaphragm 150 provides a seal to prevent passage of hydrogen and also provides a means to actuate the moveable valve portion 135 via an external actuator, which may press on the diaphragm to transfer force to the moveable valve portion 135 to overcome the spring bias holding the valve in a closed position.

The valve 110 may be opened by the actuator once it is inserted into a fuel cell system. The cartridge may have an adhesive backed foil covering the second fixed valve portion layer 140, sealing the cartridge 100 prior to first use. The foil is removed prior to inserting the cartridge into a fuel cell system. The cartridge may have provisions for sealing the cartridge into a fuel cell system, such as an o-ring or o-rings indicated at 155.

FIG. 1 shows a space between each of the valve portions for ease of illustration. However, the valve portions in one embodiment are positioned to have a very close fit, and slide against each other to provide a valve function to hydrogen gas generated from fuel 120. A lubricant such as a light oil may be applied between the fixed and moveable valves, to reduce friction and improve sealing.

A double sided configuration may be symmetrical about the fuel, such that two valves and two selectively permeable membranes are present, one on either side of the fuel. In further embodiments, the valve may extend only a portion of the length of the cartridge, with a corresponding length of the fixed valve portion 130 being perforated. In still further embodiments, the cartridge may be cylindrical, with the valve extending around the entire circular outside portion of the cartridge.

In further embodiments, the openings in the valve portions need not have the same pattern. For instance, the moveable valve portion 135 may have triangular openings and the fixed valve portions may have square openings. Movement of the moveable valve portion 135 may then result in an exponential control function for providing hydrogen via the external actuator.

In one embodiment, the actuator may simply be a protrusion within the fuel cell system that actuates the moveable valve portion 135 when the container 100 is inserted into the fuel cell system. In one embodiment, sealing mechanisms, such as the o-ring 155 is already engaged during insertion prior to actuation of the valve 110.

In various embodiments, the fuel 120 may be a waterreactive chemical that liberates hydrogen spontaneously upon reacting with water. A range of fuels are possible, including a chemical hydrides, reactive metals etc. Specifically, LiAlH4 and AlH3 and preferred. The fuel may be processed to have a specific particle size and distribution. The fuel may also be coated or chemically modified to reduce its reactivity with oxygen, water, or other chemicals. The fuel may be pressed to a specific density, and contain pores that will accommodate reaction product expansion as the fuel is converted to reaction products.

In one embodiment, the fuel may be formed in a hydraulic press with a die, and contain particle sizes in the range of 1 to 100 µm. In one embodiment, the size of the particles may be between 5 to 10 µm. The particles may all be the same size, or may have different ranges of particle sizes within one or more of the above ranges. In one embodiment, particle sizes outside of the above ranges are limited so as to not adversely affect performance of hydrogen generation and utilization of the fuel.

Figure 2:
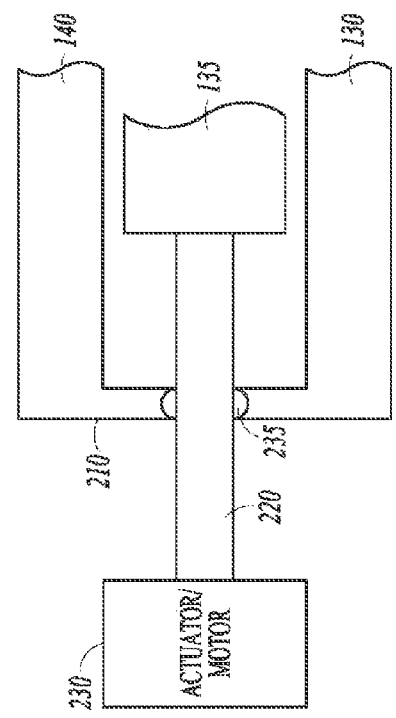
FIG. 2 is a block cross section diagram illustrating details of an actuator pin for the hydrogen fuel cartridge according to an example embodiment.

FIG. 2 is a block diagram view of an end of a valve 110 that illustrates a feed-through actuator mechanism. Valve 110 contains an end 210 having an opening to allow feedthrough of an actuator arm 220 that is coupled between the moveable valve portion 135 and an actuator 230. A sealing member 235, such as an o-ring, may be disposed in the opening to form a sealing fit with the actuator arm 220. The arm may be a pin, or other structure in various embodiments, and the actuator may be a linear actuator utilizing a DC electric motor, a screw type actuator, rotary actuator, or any other mechanism providing movement to actuate the sliding valve portion 135.

FIG. 3 illustrates a power generator 300, including a metal or polymer case 305 that includes a fuel cell 310 to convert the hydrogen and oxygen from ambient to electricity and water vapors when the cartridge 100 is inserted into an opening 320 in the power generator 300. In some embodiments, the power generator 300 may have multiple openings for multiple fuel cartridges. The power generator 300 in one embodiment contains a latching mechanism 330 to hold one or more cartridges in place when inserted, such as in the same manner memory cards are inserted into a slot in a laptop computer and then pressed in again to release them. Similar structures and mechanisms may be used in the power generator. An actuator pin 340 may be positioned to cause the sliding valve portion 135 to move such that the valve 110 is in an open position when the fuel cartridge 100 is fully inserted into the opening 320. The pin may be fixed with respect to the case 305 or controlled by an actuator 365. Actuator 365 may be used to control the valve to provide a desired amount of hydrogen flow in some embodiments. The actuator 365 may include electronics suitable to implement a control function, and may also be coupled to sensors 355 to provide feedback regarding power consumption, temperature, or other conditions, and may also be coupled to a battery 360 or other source of power.

Hydrogen generated in the fuel cartridge is consumed at anode 345 of the fuel cell 310, while oxygen in the ambient airflow is consumed at a cathode 350 of the fuel cell 310. The fuel cell 310 produces water vapor when reacting the hydrogen and oxygen, as well as electricity. The water vapor may be returned to cartridge 100 for use in generating more hydrogen. In some embodiments, the opening, or cartridge may include a further source of water vapor, either in the form of a water reservoir, or a passage to ambient with a suitable membrane to prevent hydrogen from escaping to ambient.

EXAMPLES

1. A hydrogen generating fuel cartridge comprising:
a case having a perforated opening layer;
a hydrogen producing fuel disposed within the case;
a hydrogen permeable membrane disposed between the hydrogen producing fuel and the perforated opening layer in the case; and
a spring loaded slideable valve plate positioned adjacent the perforated opening layer, such that the slideable valve plate and perforated opening form a valve that is biased in a closed position to prevent hydrogen from escaping from the fuel cartridge.

2. The hydrogen generating fuel cartridge of example 1 and further comprising a pin coupled to the slideable valve portion to move the slideable valve portion responsive to an actuator.

3. The hydrogen generating fuel cartridge of any of examples 1-2 and further comprising a sealing member to seal the hydrogen producing fuel cartridge when inserted into a power generator.

4. The hydrogen generating fuel cartridge of example 3 wherein the sealing member comprises an o-ring disposed around an end of the cartridge.

5. The hydrogen generating fuel cartridge of any of examples 1-4 wherein the slideable valve plate is perforated to overlap the perforations in the perforated opening layer when the valve is open to allow hydrogen to pass through the overlapped perforations.

6. The hydrogen generating fuel cartridge of example 5 wherein the perforations are rectangular.

7. The hydrogen generating fuel cartridge of any of examples 5-6 wherein the perforations in both the plate and layer have a matching pattern.

8. The hydrogen generating fuel cartridge of any of examples 5-7 wherein selected perforations are triangular in shape to provide an exponential valve function when the slideable valve plate is moved.

9. The hydrogen generating fuel cartridge of any of examples 1-8 wherein the slideable valve plate is coupled to a spring on a first end supported by the case that biases the slideable valve plate such that the valve is in a closed position when the cartridge is not inserted into a power generator.

10. The hydrogen generating fuel cartridge of example 9 and further comprising an actuator pin coupled to a second end of the slideable valve to couple to an actuator to move the slideable valve plate.

11. The hydrogen generating fuel cartridge of example 10 and further comprising a flexible sealing diaphragm coupled to the actuator pin to couple to the actuator.

12. The hydrogen generating fuel cartridge of any of examples 10-11 wherein the actuator pin is responsive to a fixed position protrusion within a power generator when the cartridge is inserted into the power generator.

13. A hydrogen generating fuel cartridge comprising:
a case having a perforated opening layer;
a hydrogen producing fuel disposed within the case and contained by the perforated opening layer;
a hydrogen permeable membrane is disposed between the hydrogen producing fuel and the perforated opening layer in the case:
a slideable valve plate positioned adjacent the perforated opening layer, such that the slideable valve plate and perforated opening form a valve;
a spring coupled between the case and the slideable valve plate to bias the slideable valve plate in a closed position to prevent hydrogen from escaping from the fuel cartridge; and
a perforated outside layer positioned to sandwich the slideable valve plate between the perforated opening layer and perforated outside layer.

14. The hydrogen generating fuel cartridge of example 13 and further comprising an actuator pin coupled to the slideable valve portion to move the slideable valve portion responsive to an actuator.

15. The hydrogen generating fuel cartridge of any of examples 13-14 and further comprising a flexible sealing diaphragm coupled to the actuator pin to couple to the actuator.

16. The hydrogen generating fuel cartridge of any of examples 13-15 and further comprising a sealing member to seal the hydrogen producing fuel cartridge when inserted into a power generator.

17. The hydrogen generating fuel cartridge of any of examples 13-16 wherein the perforations in both the plate and layers have a matching pattern.

18. A method comprising:
inserting a fuel cartridge into a power generator opening;
engaging an actuator spring while inserting the fuel cartridge;
moving a slideable valve in the fuel cartridge from a spring loaded closed position to an open position when the fuel cartridge is fully inserted into the power generator opening.

19. The method of example 18 and further comprising engaging a sealing member between the fuel cartridge and the power generator opening when the fuel cartridge is inserted.

20. The method of any of examples 18-19 and further comprising removing a foil seal on the fuel cartridge prior to inserting the fuel cartridge into the opening of the power generator.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
inserting a fuel cartridge into a power generator opening;
engaging a spring while inserting the fuel cartridge;
moving a perforated slideable valve in the fuel cartridge from a spring-loaded closed position to an open position when the fuel cartridge is fully inserted into the power generator opening, wherein selected slideable valve perforations are shaped to provide an exponential control function for the perforated slideable valve when the perforated slideable valve is moved.

2. The method of claim 1, wherein a power generator includes a perforated opening layer, the perforated opening layer adjacent to the fuel cartridge perforated slideable valve when the fuel cartridge is fully inserted into the power generator opening.

3. The method of claim 2, wherein perforations in both the perforated slideable valve and perforated opening layer include a matching pattern.

4. The method of claim 1, wherein:
the fuel cartridge perforated slideable valve is sandwiched between the perforated opening layer and a perforated outside layer; and
perforations in the perforated slideable valve are arranged to overlap perforations in the perforated opening layer and in the perforated outside layer when the fuel cartridge is fully inserted into the power generator opening.

5. The method of claim 1, further including engaging a sealing member between the fuel cartridge and the power generator opening to seal the fuel cartridge when the fuel cartridge is inserted.

6. The method of claim 1, wherein the fuel cartridge includes a hydrogen gas producing fuel disposed in the fuel cartridge.

7. The method of claim 1, wherein the selected slideable valve perforations include rectangular perforations.

8. The method of claim 1, wherein the selected slideable valve perforations include triangular perforations.

9. The method of claim 1, wherein the perforated slideable valve is coupled to the valve spring on a first end supported by the fuel cartridge that biases the perforated slideable valve such that the perforated slideable valve is in the spring-loaded closed position when the fuel cartridge is not inserted into the power generator.

10. The method of claim 9, wherein moving the perforated slideable valve includes moving an actuator pin coupled to a second end of the perforated slideable valve and coupled to an actuator.

11. The method of claim 10, wherein moving the perforated slideable valve includes moving a flexible sealing diaphragm coupled to the actuator pin.

12. The method of claim 1, wherein moving the perforated slideable valve in the fuel cartridge from the spring-loaded closed position to the open position includes moving the perforated slideable valve responsive to an actuator arm within a power generator, the actuator arm including a fixed protrusion within the power generator.

* * * * *